Feb. 24, 1959  H. F. PATTERSON  2,874,500
LOAD BEARING PLATE AND METHOD FOR SECURING THE
PLATE AND OTHER OBJECTS TO A SMOOTH SURFACE
Filed June 4, 1956  2 Sheets-Sheet 1

INVENTOR.
HOWARD FRANK PATTERSON
BY
HIS ATTORNEYS

Feb. 24, 1959 H. F. PATTERSON 2,874,500
LOAD BEARING PLATE AND METHOD FOR SECURING THE
PLATE AND OTHER OBJECTS TO A SMOOTH SURFACE
Filed June 4, 1956 2 Sheets-Sheet 2

INVENTOR.
HOWARD FRANK PATTERSON
BY
HIS ATTORNEYS

United States Patent Office 2,874,500
Patented Feb. 24, 1959

2,874,500

LOAD BEARING PLATE AND METHOD FOR SECURING THE PLATE AND OTHER OBJECTS TO A SMOOTH SURFACE

Howard Frank Patterson, Dayton, Ohio

Application June 4, 1956, Serial No. 589,136

3 Claims. (Cl. 41—34)

This invention relates to a load bearing plate for attachment to a wall surface and to a method for thermally bonding the plate, as well as other objects, to a smooth wall surface, and more particularly to a method employing thermal responsive adhesives, although not necessarily so limited.

The increased popularity in recent years of dry wall construction in homes has created a demand for suitable wall fixtures for hanging pictures, draperies and the like. Ordinary picture hooks, secured by a nail, are frequently unsatisfactory for use with ordinary wall board, for the reason that objects can be hung upon the wall only when there is a stud properly located behind the wall board to receive the nail. Efforts to employ adhesives in hanging pictures and the like have been only partially successful, for the reason that insufficient structural strengths are obtained.

An object of the present invention is to provide an economic method for securing an object to a smooth surface wherein a thermal adhesive bond is provided between the surface and the object.

Another object of the present invention is to provide a method for securing an object to a smooth surface wherein a heat activated adhesive is employed and wherein it is unnecessary to apply heat directly to the surface to be decorated.

A further object of this invention is to provide a rigid load supporting plate for adhesive attachment to a wall surface, the plate having a decorative geometric shape providing a maximum area of adhesion where the tensile stresses to which the plate is subjected are greatest.

Other objects and advantages reside in the construction of parts, the combination thereof, the method of manufacture and the mode of operation, as will become more apparent from the following description.

The following description makes reference to a thermal responsive adhesive. This term is employed to designate a material, or combination of materials, which, while not ordinarily possessing adhesive properties at room temperature, can be utilized to effect an adhesive bond between two surfaces when heated to an elevated temperature, then subsequently cooled to room temperature in contact with the surfaces to be bonded. Although many resins, waxes and plastics have adhesion qualities which fall within the scope of this description, the method of this invention concerns primarily mixtures of materials which, when heated, undergo a chemical reaction, to thereby obtain adhesive properties.

The particular method for obtaining an adhesive bond described hereinbelow is well suited for both interior and exterior wall surfaces. To emphasize the broad application of the adhesive bonding method, the method is first applied to the problem of securing decorative trim, lettering, and the like to outside wall surfaces. Specialized adaptations for plaster wall board and other interior wall surfaces follow.

Figure 1:
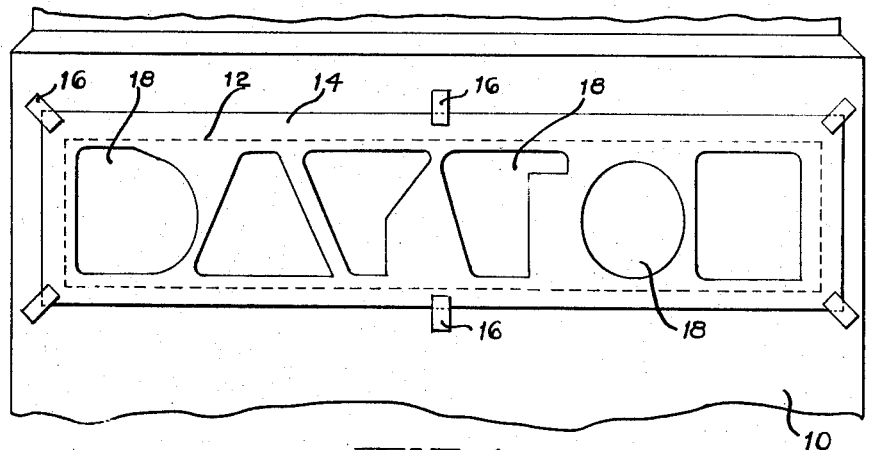
Figure 1 is an elevational view of a portion of a wall having a strip of adhesive material and a template temporarily secured in position.

Referring to the drawings in detail, a construction block, representing part of the exterior wall of a building, is indicated by the reference numeral 10. The construction block may be stone, preferably having a polished surface, or porcelain, ceramic tile, metal, glass, concrete, plaster, or any other suitable construction material.

In attaching letters or other objects to the surface of the construction block, a layer or foil 12 of a thermal responsive adhesive is affixed to the surface. Any suitable adhesive tape or the like may be used for securing the edges of the foil to the surface of the construction block.

The layer of adhesive material consists of a sheet of comparatively thin material that is non-tacky at ordinary room temperature; but upon being heated at a temperature much higher than ordinary ambient atmospheric temperature, it becomes activated so as to have the properties of an adhesive material. By heating one surface of the sheet of material, the entire thickness of this layer of adhesive material is activated even though one face of the sheet may abut a cold surface.

Over the layer 12 of adhesive material is placed a template 14, the template being secured, as shown, by short lengths 16 of adhesive tape or by other suitable means. The template 14 is provided with pre-cut apertures 18 which serve as guides for spacing and aligning letters to be attached to the surface of the construction block 10.

The template illustrated in Figure 1 provides a guide for properly aligning and spacing the letters in the word Dayton. Each of the letters in the word Dayton is properly positioned when seated within the proper aperture 18, so as to engage the marginal portions of the template at the lower right boundary of the aperture.

Figure 2:
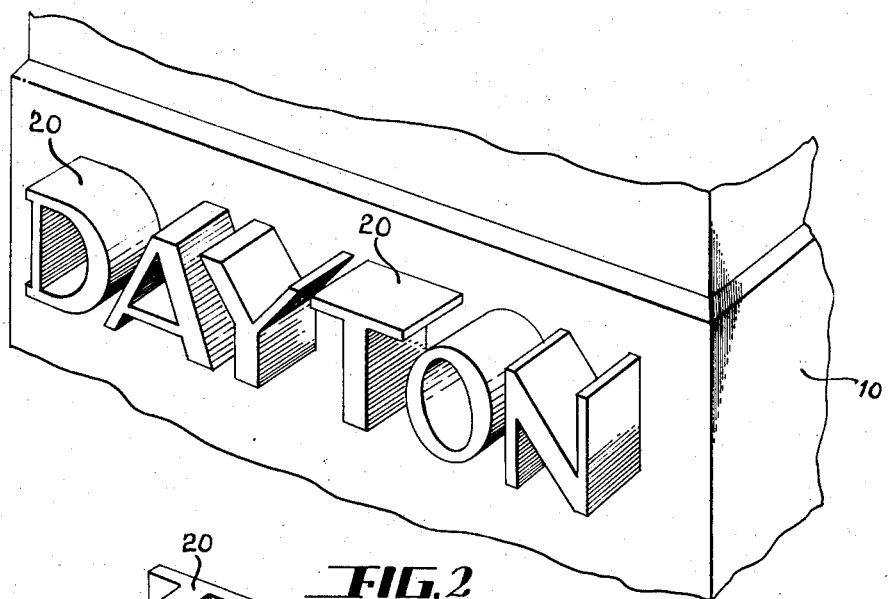
Figure 2 is a fragmentary, perspective view showing a portion of a wall with letters secured thereto.
Figure 3:
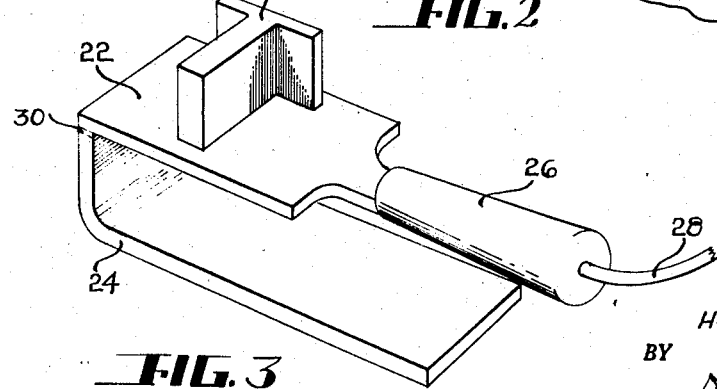
Figure 3 is a perspective view of a heater element employed in this invention.

Letters 20 to be secured to the construction block are illustrated in Figures 2 and 3. The letters may be metal, glass, ceramic tile, or any other decorative material. The letter can be a plastic, for example, subject to the limitation that the plastic have a sufficiently high melting point.

Embossed letters 20 are illustrated. Clearly, the letters may also be substantially flat letters and, further, it would be no limitation to the present method to recess the letters in suitable cavities provided in the construction block 10.

Prior to attaching the letters to the construction block 10, the letters are first heated with an apparatus such as that shown in Figure 3 of the drawing. The apparatus of Figure 3 comprises a flat metal plate 22 supported by an L-shaped bracket 24. The plate 22 is heated with a resistance element (not shown) located therein. A handle 26 projects from the plate 22. The resistance element is supplied with electrical energy through a conductor 28. In order to avoid excessive heat losses, an insulating layer 30 is provided between the flat plate 22 and the bracket 24.

The letter 20 has its surface to be attached heated upon the flat plate 22 to a predetermined temperature, the temperature required being dependent upon the nature of the thermal responsive adhesive used. When the surface of the letter to be attached reaches the proper temperature, the letter is removed from the flat plate 22 and the heated surface of the latter placed in contact with the adhesive layer 12 and in proper engagement with the template 14.

The heat energy stored in the letter 20 activates the thermal responsive adhesive layer. By pressing the letters against the construction block, the adhesive is caused to flow into intimate contact with the surface of the letter 20 and the surface of he construction block 10. The letter is pressed against the adhesive and the wall while the thermal responsive material cools permitting the adhesive to set, thus firmly bonding the letter to the construction block. Usually it is necessary to cool slightly, only for a comparatively short time, probably 90 seconds to 5 minutes, under manual pressure. When all of the letters have been bonded to the construction block by this method, the template may be removed and the unused portion of the adhesive foil 12 cut away from the construction block.

It is evident that the actual thermal responsive adhesive material selected in the present method will depend upon the composition of the construction block 10 and the letters 20. Further, it is evident that symbols or objects other than letters may be secured to a wall or other support by the method outlined.

One of the important benefits derived from the present method is that there is no necessity for heating the construction block or other external wall surface. Clearly, if the letter or symbol were heated in contact with the construction block, considerably more time and heat would be required to fuse the thermal responsive adhesive layer than is required in the present process.

Although letters and other objects constructed from materials other than metal may be utilized in conjunction with the present method, metallic objects are most amenable to the method, for the reason that the higher heat conductivity of metals enables a satisfactory transfer of heat from the heated object to the adhesive layer.

The use of a template is, of course, a matter of choice and not essential to the successful utilization of the present method. A template has been described primarily to illustrate that the present method is amenable to the use of templates.

Figure 4:
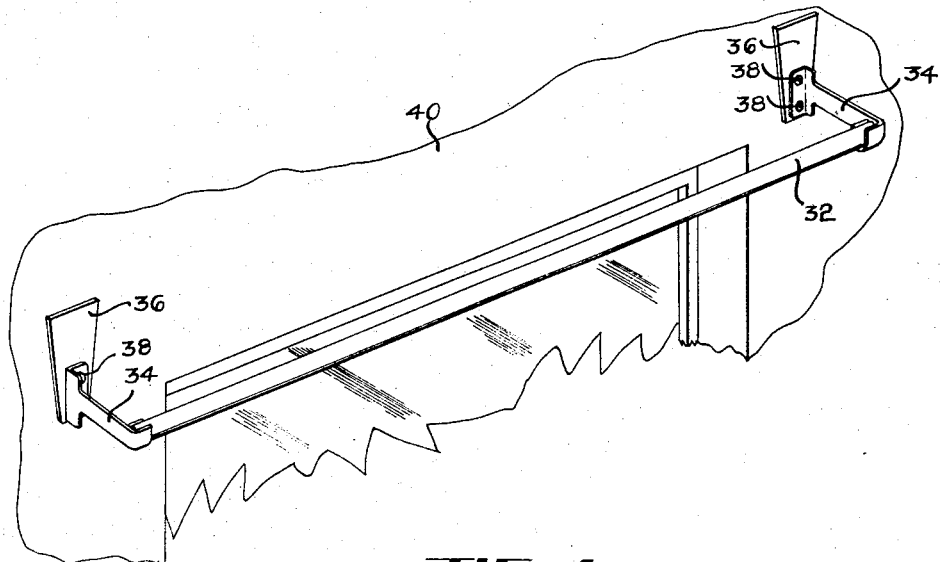
Figure 4 is a fragmentary, perspective view of drapery rods secured to an interior wall by the techniques of this invention.
Figure 5:
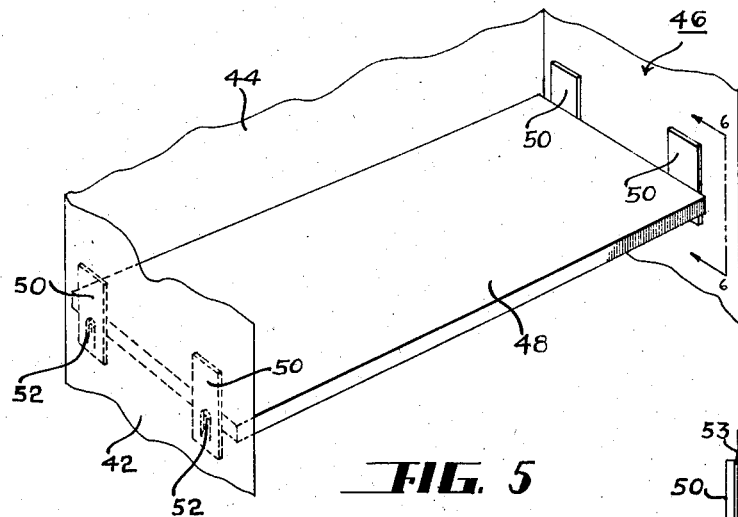
Figure 5 is a fragmentary, perspective view of a shelf secured to interior walls by the techniques of this invention.
Figure 6:
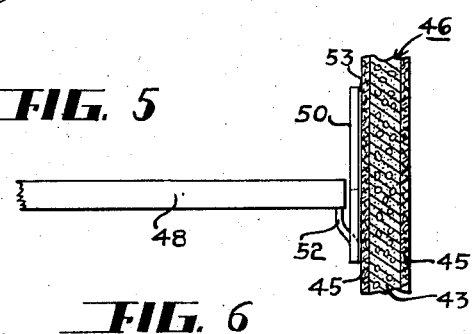
Figure 6 is a sectional view, with parts broken away, taken substantially along the line 6—6 of Figure 5.

Figures 4, 5 and 6 illustrate the application of the present method to interior wall surfaces, particularly to the dry wall construction employing plaster board and fibrous sheet laminates.

In Figure 4, a drapery rod 32 is shown supported by arms 34 secured to keystone plates 36 by means of threaded screws 38 engaging the keystone plate. The keystone plate 36 is secured to the interior wall 40 by the method of this invention, the plate 36 being heated with the arm 34 detached and subsequently applied to a layer of thermal responsive adhesive, not shown, mounted in contact with the wall 40.

The keystone shape of the plate 36 is functional, as well as decorative. It is evident that the weight of the curtain or drapery suspended from the rod 32 will exert a tensive force tending to pull the upper portion of the plate away from the wall and a compressive force tending to push the lower portion of the plate into the wall. The compressive force is of little importance, since this is opposed by the wall 40.

The tensive force to which the plate 36 is subjected must be opposed by the adhesive bond. It is thus desirable to design the plate 36 so as to have the greatest area of adhesive contact distributed in the upper portion of the plate remote from the arm 34. The keystone shape is illustrative of decorative patterns meeting this requirement.

The composition of the plate 36 is important insofar as the plate must be rigid and must have adequate heat conductivity for the purposes of the bonding method herein described. The plate 36 is preferably a metallic plate, which, for reasons of economy, may be iron, steel or aluminum.

Figure 5 illustrates the utilization of the thermal bonding method for installing cupboard or closet shelves. The reference numerals 42, 44 and 46 indicate three walls of a closet or cupboard, which for purposes of illustration, are conventional plasterboard, as shown in exaggerated detail in section in Figure 6. The plasterboard comprises a layer of plaster 43 having one layer of fibrous material 45 laminated to each side thereof. A shelf 48, which may be of wood construction, or of any other suitable material, is secured to the opposite parallel walls 42 and 46 by a plurality of load bearing plates 50, there being two load bearing plates 50 secured in parallel positions on each wall 42 and 46 by the thermal bonding method of this invention.

Each load bearing plate 50 is provided with an upwardly directed hook member 52 struck out from the plane of the plate 50 in the lower portion thereof. The single hook members 52 in the four load bearing plates 50 cooperate to engage and support the shelf 48.

Inasmuch as the hook member 52 projects outwardly only a short distance from the plane of the plate 50, the tensive stresses to which the plate 50 are subjected when a load is placed on the self 48 are relatively inconsequential, whereas the shearing stresses to which the adhesive layer 53 securing the plate to the wall is subjected may be considerable. Accordingly, the shape of the plate 50 is of little consequence, the total area of adhesive contact only being of importance. For the present illustration, then, the plate 50 is preferably square or circular in shape.

It is to be understood that the drawings illustrate but a few of the many applications of the thermal bonding method and products herein described.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. The method for securing an object to a smooth surface comprising the steps of affixing a layer of thermal responsive adhesive to said surface, supply heat to said object apart from said surface and the adhesive layer thereon, pressing the preheated object against the adhesive layer, and allowing the object to cool under pressure so as to maintain contact with the adhesive layer.

2. The method of securing an object to a smooth surface comprising the steps of affixing a layer of thermal responsive adhesive to said surface, said layer being non-tacky at ordinary ambient atmospheric temperature, placing a suitably cut template over said adhesive layer, supplying heat to one surface of said object while separated from said smooth surface and the adhesive layer thereon, pressing the preheated surface of said object against the adhesive layer using the template as a guide for positioning said object, and allowing the object to cool under pressure so as to maintain contact with the adhesive layer.

3. The method of securing an object to a smooth surface comprising the steps of affixing a layer of thermal responsive adhesive to said surface, placing a suitably cut template over said adhesive layer, supplying heat to one surface of said object while separated from said smooth surface and the adhesive layer thereon, pressing the preheated surface of said object against the adhesive surface using the template as a guide for positioning said object, allowing the object to cool under pressure so as to maintain contact with the adhesive layer, and cutting away the excess adhesive material.

References Cited in the file of this patent

UNITED STATES PATENTS

| | | |
|---|---|---|
| 178,308 | Leather et al. | June 6, 1876 |
| 1,999,509 | Merritt | Apr. 30, 1935 |
| 2,096,750 | Lawrence | Oct. 26, 1937 |
| 2,122,999 | Burke | July 5, 1938 |
| 2,637,995 | Mann | May 12, 1953 |
| 2,728,703 | Kiernan | Dec. 27, 1955 |

FOREIGN PATENTS

| | | |
|---|---|---|
| 451,560 | Great Britain | Aug. 7, 1936 |